United States Patent [19]

Kalisch et al.

[11] Patent Number: 5,025,933
[45] Date of Patent: Jun. 25, 1991

[54] BICYCLE STAND

[76] Inventors: Heinrich Kalisch, Lenaustrasse 77; Rolf Meurer, Am Weimarfloss 9, both of 6000 Frankfurt/Main, Fed. Rep. of Germany

[21] Appl. No.: 63,130
[22] PCT Filed: Oct. 2, 1986
[86] PCT No.: PCT/DE86/00399
 § 371 Date: Jun. 4, 1987
 § 102(e) Date: Jun. 4, 1987
[87] PCT Pub. No.: WO87/02000
 PCT Pub. Date: Apr. 9, 1987

[30] Foreign Application Priority Data

Oct. 4, 1985 [DE] Fed. Rep. of Germany ....... 3535525

[51] Int. Cl.$^5$ ................................................. A47F 7/00
[52] U.S. Cl. ..................................... 211/22; 211/189; 211/181
[58] Field of Search ....................... 211/22, 17, 20, 189, 211/182, 181, 5, 24, 23; 248/153, 174, 175

[56] References Cited

U.S. PATENT DOCUMENTS 3,785,500 1/1974 Kennelly ................................. 211/5
4,306,660 12/1981 Livingston ............................. 211/20

FOREIGN PATENT DOCUMENTS 516867 1/1953 Belgium ................................. 211/20
2640 10/1899 Denmark ............................... 211/20
8512445 10/1985 Fed. Rep. of Germany .
31266 10/1933 Netherlands .......................... 211/17
169061 9/1921 United Kingdom .................. 211/20

Primary Examiner—Carl D. Friedman
Assistant Examiner—Sarah Lechok
Attorney, Agent, or Firm—Michael J. Striker

[57] ABSTRACT

A bicycle stand for the reciprocal parking of bicycles consists of a vertically arranged spiral portion of circularly bent pipe or solid material. This spiral portion stands on the ground with its ends. The height of the spiral portion corresponds to the average height of the steering head pipe/handlebar shaft and seat support/upper portion rear seat stay areas of commercially available bicycles. A connecting brace (6) having angular pieces at the oppositely located arc-shaped portions of the spiral portion is provided in its lower area. The spiral portion is left-handed or right-handed. Fixed but detachable end pieces or spacer-connection pieces of an optional shape are attachable at the ends of the spiral portion.

21 Claims, 5 Drawing Sheets

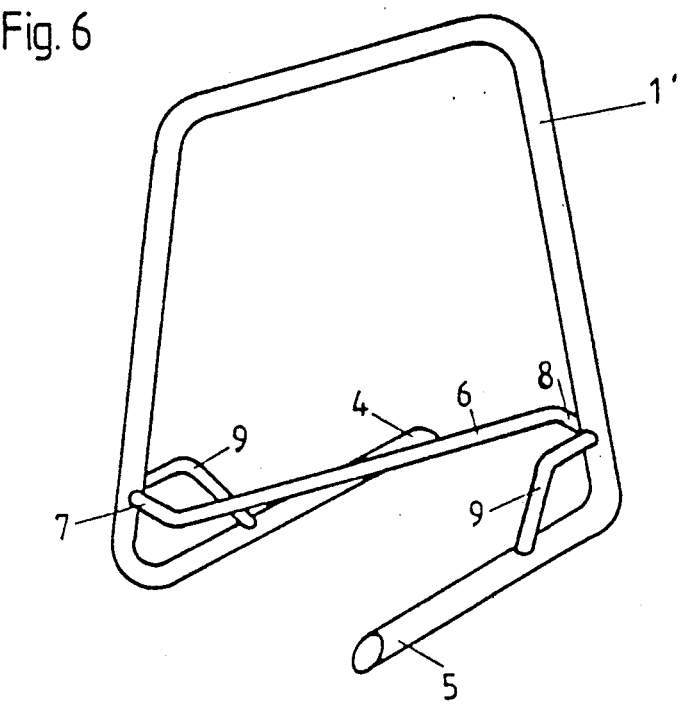
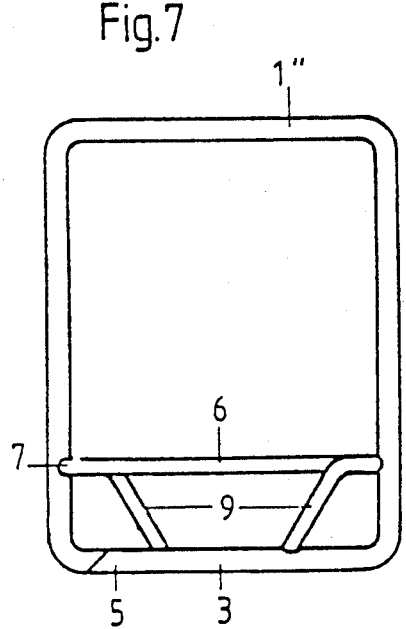
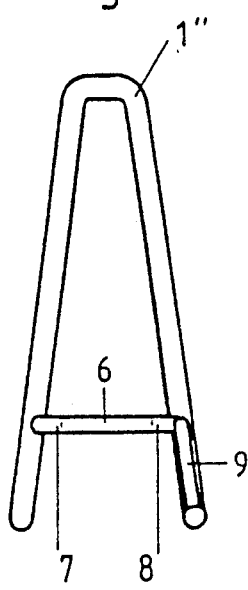
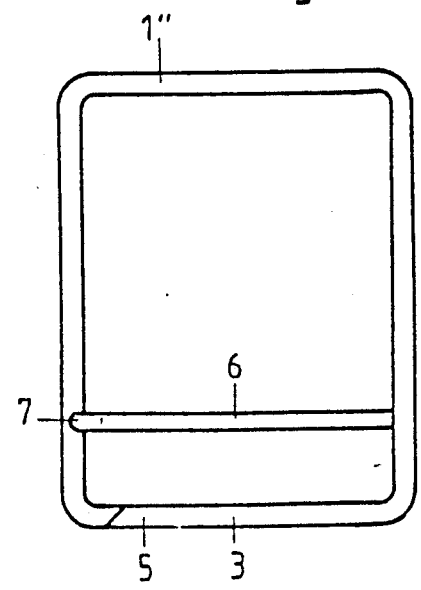

BICYCLE STAND

BACKGROUND OF THE INVENTION

The invention relates to a bicycle stand for leaning the bicycle, in connection with the adjustment of a wheel of the parked bicycle in the manner of pliers. The invention is determined and suitable for parking up to two bicycles by a single stand, as well as for forming bicycle parking systems with a desired number of parking places for bicycles.

Bicycle stands have been known and have been in use in various styles for a long time. Among those in use for the longest time are so-called traditional commercial stands in which metal bars are made in the shape of an acute triangle, in which the smallest angle is located at the upper point, and in which a plurality of such triangles are fastened so as to be spaced by approximately 10 cm on a base frame or transverse tie-bars in such a way that they extend parallel relative to one another. The front wheel of the bicycle is pushed into the grate, which is formed in this manner, wherein it is possible to use both sides. The chief disadvantage of these traditional commercial stands is that the handlebars, front-wheel hubs or pedals of bicycles which are parked next to or opposite one another can hook into one another. Moreover, they are fixed so as to be unchangeable with respect to the number of parking places, easily lead to damage to the parked bicycles by means of their own structural component parts (particularly damage to the finish, guard plates, etc.) and are also unsatisfactory with respect to appearance.

In addition, skid stands, in which sheet-metal strips which are bent to form skids are welded onto frames or L-shaped angles and in which the arrangement is effected in a flat manner or at an inclined angle, have been known for a long time. These skid stands do avoid the risk of damage to the parked bicycle, namely the forks, handlebars and wheels, provided a sufficient spacing is maintained between the individual skids which are located next to one another. But the skids only provide an insufficient support, since the parked bicycle is grasped by the skid only by the tires of one or both wheels and, at most, at a short area of the wheel rim. In addition, there is the risk of damage to the wheels due to bending of the rims and—when stood up—the risk of the wheel falling down if it is not carefully parked. Finally, these skid stands require a lot of space and also cannot be adapted to the respective requirement of parking places.

Also in use are the so-called clip wheel stands, in which two parallel, vertically arranged stirrups are connected with one another and fastened to supports, tie-bars or a wall in such a way that they have a vertically extending gap along their entire depth, or in part. The front wheel of the bicycle to be parked is inserted in these stands in order to be adjusted therein. These clip wheel stands also have substantial disadvantages. In particular, the adjustment of the parked bicycle is usually unsatisfactory because of the different widths of the tires/rims of bicycles in use. In addition, the clip stirrups can be bent relatively easily so that they are completely unusable. In addition, every bicycle stand requires either its own support, which is firmly anchored in the ground, or cross-bars with a corresponding anchoring or fastening element for walls. The anchoring of the support in the ground is also susceptible to damage when the bicycle stands alone. Finally, the clip wheel stands are unsatisfactory with respect to appearance, regardless of the related shape of the stirrups of the clips.

The aforementioned disadvantages of the clip wheel stands also apply substantially to the stirrup wheel stands, in which stirrups, which substantially correspond to the stirrups of the clips and have a horizontally extending opening, are stood on the ground or are anchored in the ground. In particular, they also have the disadvantage of unsatisfactory stability in many types of bicycle with narrow tires or small wheels; moreover, they are not very stable to the extent that they are not anchored in the ground.

The bicycle railings, which are related as an alternative and which consist of a tubular stirrup for leaning the bicycle at mid-height or at the height of the steering head pipe/handlebar shaft, have substantial disadvantages. On the one hand, the leaning bicycle has relatively little support at the vertical tubular stirrup and it requires careful leaning with the necessary inclination. On the other hand, the tubular stirrup must absolutely be anchored in the subsoil or the bicycle railing must be provided with base plates having a large surface area, that is, in order to be sufficiently stable when a bicycle is parked on one side. In addition, there is a considerable space requirement. In addition to the described disadvantages of the stirrup stands, parking grooves, which are arranged in the ground of the parking place and in which one wheel of the bicycle is inserted (concrete formed blocks, cast grooves, etc.), have the further disadvantage of collecting street dirt quickly.

SUMMARY OF THE INVENTION

The invention has the object of providing a bicycle stand of the foregoing type, in which, while avoiding the disadvantages of the known constructions, greater stability of the bicycle stand and the bicycles parked therein, a more rational use of the surface area available for parking the bicycles, improved spatial and aesthetic adaptation to the environment of the parking place, and the interlinkage of an optional number of bicycle stands, which is simple and is adapted to the particular conditions of the parking places, are achieved.

This object is met, according to the invention, by a bicycle stand with a spiral portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 6 shows an isometric drawing of the bicycle stand, according to the invention, with angularly bent, trapezoidal "spiral portion" with additional tie-rods;

FIG. 7 shows the bicycle stand in a side view with "spiral portion" in rectangular form and additional tie-rods, in a side view;

FIG. 8 shows the bicycle stand according to FIG. 7, but without tie-rods;

FIG. 9 shows the bicycle stand according to FIG. 7 in a front view;

DETAILED DESCRIPTION OF THE PREFERRED EMBODIMENTS

Figure 1:
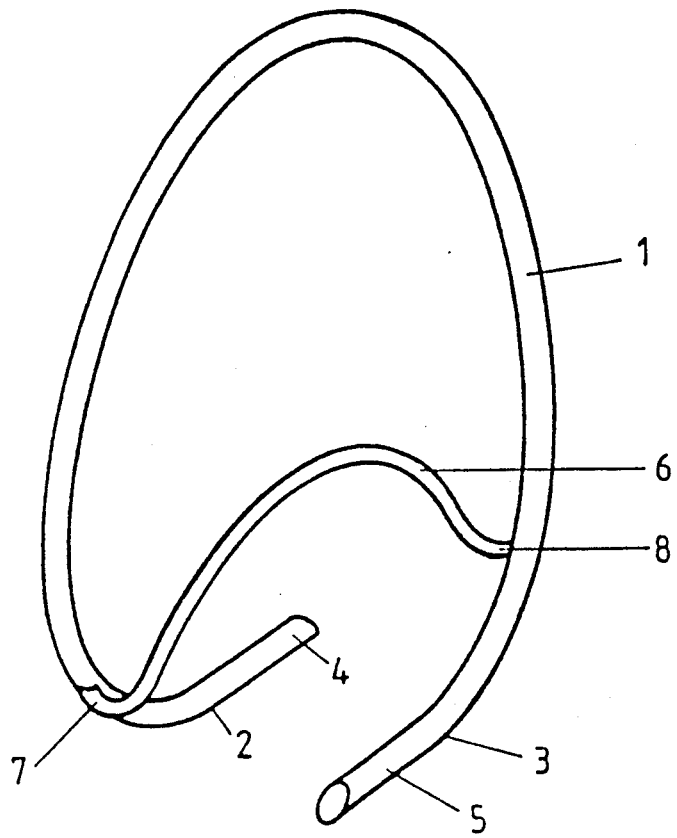
FIG. 1 shows an isometric drawing of the bicycle stand, according to the invention, with continuous end portions in the ground area.
Figure 2:
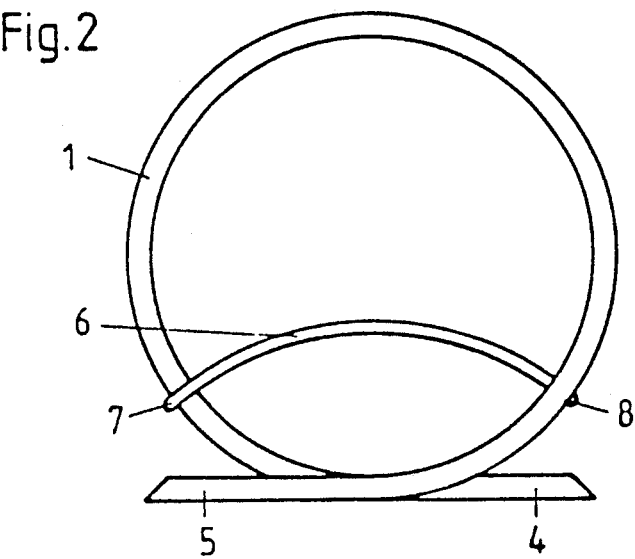
FIG. 2 shows the bicycle stand according to FIG. 1 in a side view.
Figure 3:
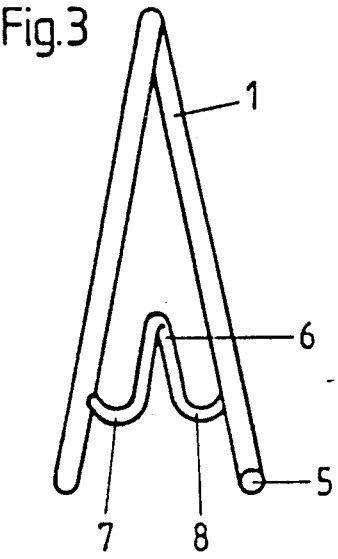
FIG. 3 shows the bicycle stand according to FIG. 1 in a front view.

In the embodiment according to FIGS. 1 to 4, the bicycle stand, according to the invention, consists of a spiral portion 1 of bent pipe which is vertically arranged and stands on the ground with its ends 2 and 3. The ends 2 and 3 of the spiral portion 1 are lengthened by means of end pieces 4 and 5 when the bicycle stand is set up individually in order to achieve greater stability. The diameter of the spiral portion 1 is dimensioned in such a way that the height of the upper vertex and the adjoining upper area correspond to the average height of the steering head pipe/handlebar shaft, seat support/upper part rear seat stays and possibly the upper pipe of commercially available bicycles.

The connecting brace 6 is attached in the lower area of the spiral portion 1, wherein its two ends 7 and 8 are shaped in such a way that ,the connecting brace 6 is at a distance from the spiral portion in the area of its two projections at the spiral portion 1, which distance corresponds at least to the largest cross-sectional width of the tires and the rims of commercially available bicycles.

Figure 4:
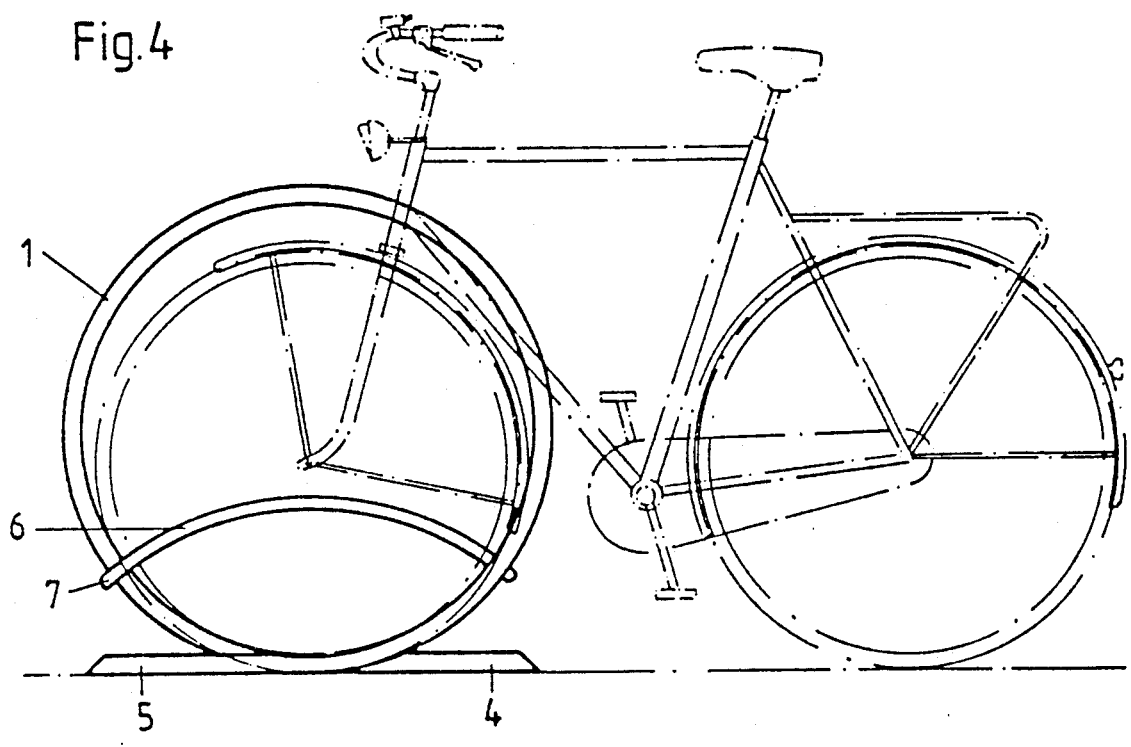
FIG. 4 shows the bicycle stand according to FIG. 2 with parked bicycle.

The described bicycle stand can receive two bicycles which are pushed into it on both longitudinal sides so as to be opposite one another, as shown in FIG. 4.

As likewise shown in FIGS. 1 to 4, the connecting brace 6 is advisably arranged at the spiral portion 1 at a height such that its ends 7 and 8 simultaneously from a stop for the bicycles which are inserted in the bicycle stands. However, the connecting brace 6 can also be arranged at another place on the spiral portion 1 and, in particular, can extend on the ground as a direct connection of the ends 2 and 3 of the spiral portion 1.

Figure 5:
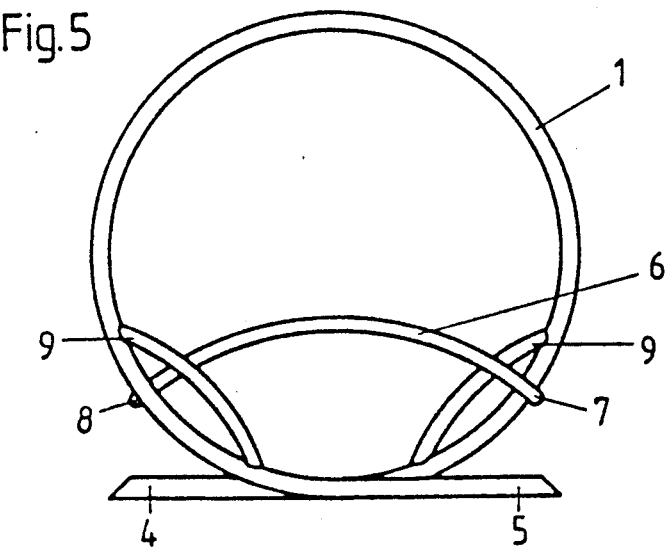
FIG. 5 shows the bicycle stand as in FIG. 1, but with right-handed spiral portion and additional tie-rods.

In a further development of the invention, shown in FIG. 5, tie-rods 9 are arranged in the lower area of the spiral portion 1 near the ground on its two sides, respectively, which tie-rods 9 laterally overlap a portion of the front or rear wheel of the bicycle inserted in the bicycle stand and thus cooperate with the connecting brace 6 as a counterpart, as retaining stirrup or clip for the bicycle.

According to the invention, the spiral portion 1 can also be right-handed, instead of left-handed as in FIGS. 1 to 4. In addition, it lies within the scope of the invention that the spiral portion 1 does not extend circularly but with a changed radius of curve, e.g. elliptically.

It is also within the scope of the invention, as shown in FIGS. 6 to 9, to bend the pipe of the spiral portion 1 angularly rather than bending it so as to be round, so that, when seen from the side, it has the shape of a trapezoid 1', rectangle 1", square, or the like, whose lower sides are bent corresponding to the described spiral portion 1 and advisably likewise have the elongations 4 and 5.

The bicycle stand can consist of different material, preferably of metal, plastic or bow wood, wherein pipe or solid material can both come into consideration.

Figure 10:
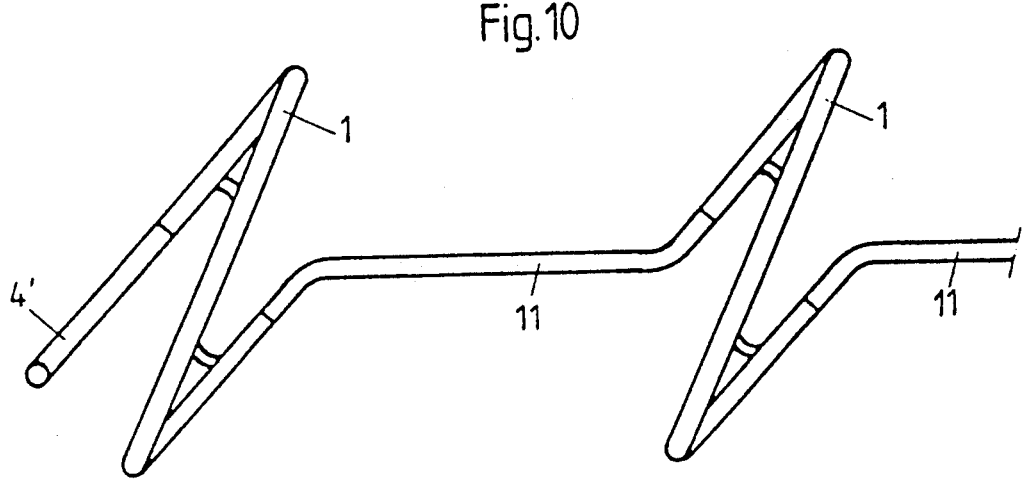
FIG. 10 shows an interlinkage of two bicycle stands, according to the invention, with spacer-connection piece, in a top view.
Figure 11:
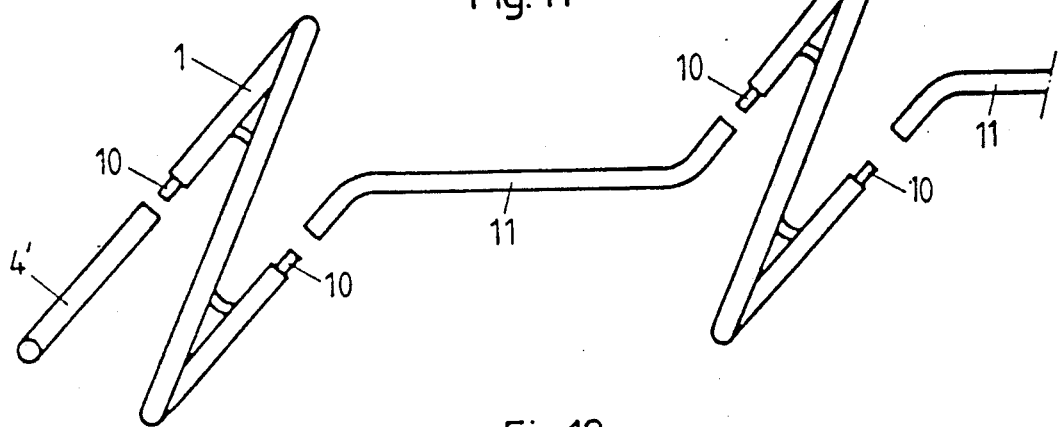
FIG. 11 shows another interlinkage of two bicycle stands, according to the invention, according to FIG. 10, but in exploded presentation.
Figure 12:
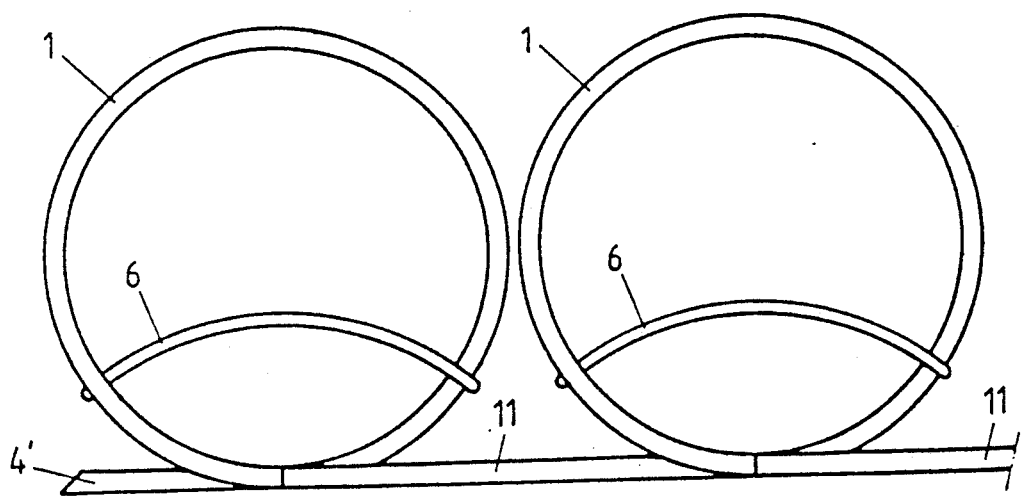
FIG. 12 shows the interlinkage of two bicycle stands, according to FIG. 10, but in a side view.

In a further embodiment of the invention, shown in FIGS. 10-12, the bicycle stand has end pieces 4', 5' at the ends 2 and 3 of the spiral portion 1, 1', 1" instead of inseparably attached end portions 4, 5, the end pieces 4', 5' being securely but detachably connected with the spiral portion 1, 1', 1" by means of pegs 10 or in another known manner (only end pieces 4' are shown). After removing one or both end pieces 4', 5', another bicycle stand, according to the invention, can be directly attached at each side of the bicycle stand. In this manner, a desired quantity of bicycle stands can be placed next to one another in a continuous type of construction, the bicycle stands having the form of a continuous spiral or spiral-like shape as seen as a whole.

As shown in FIGS. 11 to 15, spacer-connection pieces 11 to 14 are inserted between the ends of the bicycle stands on the ground of the parking place in order to interlink a plurality of bicycle stands, the shape of these spacer-connection pieces 11 to 14 being optional, and effect different arrangements and spacings of the individual bicycle stands in their interlinkage according to this shape.

Figure 13:
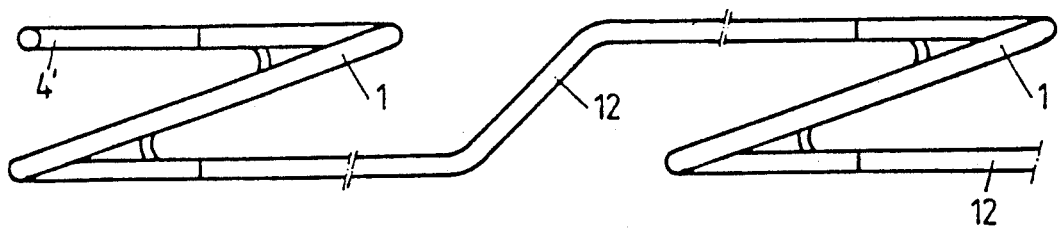
FIG. 13 shows the interlinkage of two bicycle stands, according to the invention, with a variant of the spacer-connection piece, in a top view.

FIG. 10 shows a horizontal row of bicycle stands in which the parked bicycles stand diagonally relative to the longitudinal direction of the bicycle stands, but parallel relative to one another. FIGS. 11 and 12 show an arrangement of interlinked bicycle stands which is laterally offset relative to the horizontal line, in which arrangement the bicycles also stand diagonally relative to the longitudinal direction of the bicycle stand row, but so as to be parallel relative to one another. FIG. 13 shows an interlinkage in which the bicycles—in groups of two in each instance—stand one behind the other in the longitudinal direction of the bicycle stand row.

Figure 14:
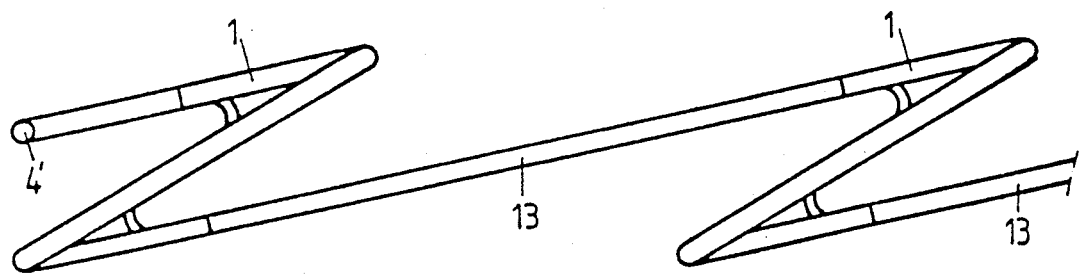
FIG. 14 shows the interlinkage of two bicycle stands, according to the invention, with another variant of the spacer-connection piece.
Figure 15:
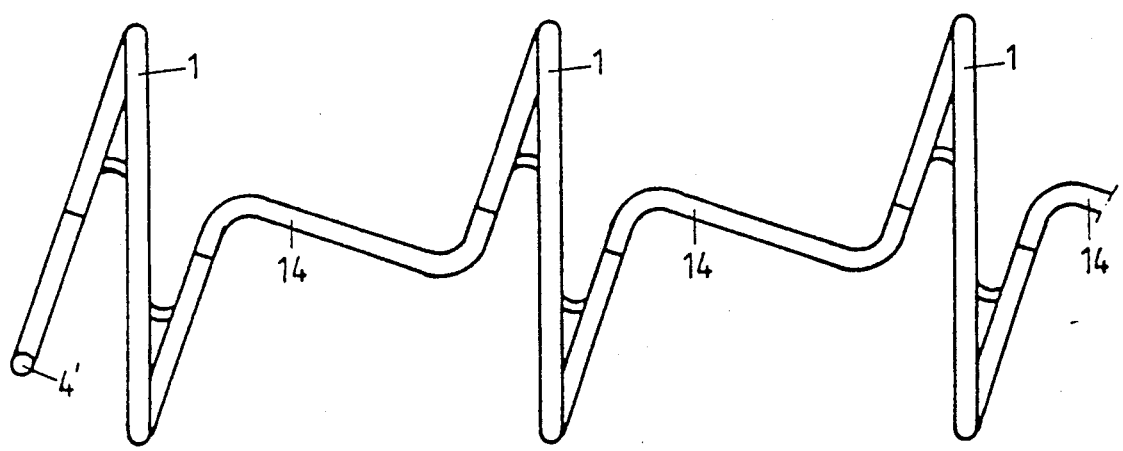
FIG. 15 shows the interlinkage of two bicycle stands, according to the invention, with another variant of the spacer-connection piece, in a top view.

FIGS. 14 and 15 show other variants of the interlinkage of the bicycle stands.

The bicycle stands, according to the invention, already have the required stability individually and also when reinforced by their interlinkage without other steps. To the extent that an additional safeguard against shifting and/or theft etc. is desired by the user, this can be effected in a known manner by means of clips, pegs, or the like, which are attached at the ends 2, 3 of the bicycle stands or, when a plurality of bicycle stands are interlinked, also at spacer-connection pieces 11, 12, 13, 14 and are anchored in the subsoil.

The bicycle stand, according to the invention, offers the following advantages relative to the known constructions: It makes use of the principle of leaning: the bicycle is accordingly not held in a portion of the front wheel like the clip and stirrup bicycle stands. Because of the shape of the spiral portion or the shape with an angular bend, which acts in the same manner, the parked bicycle leans along a wide area of the steering head pipe/handlebar shaft and/or the seat support/of the upper part of the rear seat stays and possibly of the upper pipe, wherein all commercially available bicycles are leaned in a secure manner regardless of their constructional height.

Because of the shape of the spiral portion and the consequent spreading of the bicycle stands in the ground area the required inclination of the bicycle, according to its positioning, is effected simultaneously as an advantage relative to the bicycle railings in terms of the construction in order to ensure a secure standing. The parked bicycle receives an additional support in the area of the wheel in the form of the described stop by means of the connecting brace between the two bent portions or sides in the lower area of the bicycle stand with the angular articulation of the connecting brace. In the embodiment with additional tie-rods the principle of leaning the bicycle is combined with that of clamping of the running wheel.

The bicycle stand, according to the invention, already as an individual stand, enables two bicycles to be parked. Because of the construction, according to the invention, with the parking of the two wheels from opposite direction and the guiding of the wheels in the stands by means of its predetermined shape, reciprocal obstruction of the wheels by the handlebar stirrup, wheel hubs, pedals or other structural component parts is avoided. In addition, the bicycles can be parked so as to face forward or rearward in the same manner and stand in the bicycle stand equally securely in both cases.

The bicycle stand, according to the invention, already has sufficient stability individually because of the spreading in the ground area and can therefore stand independently. In addition, it offers the considerable advantage that it can be interlinked, with or without the use of the spacer-connection pieces, in a continuous type of construction to form parking systems. The optional shape of the spacer-connection pieces, moreover, offers the possibility to adapt the spacing and the arrangement of the individual bicycle stands relative to one another in the interlinkage according to the predetermined space relationships and to achieve different overall impressions in terms of appearance simultaneously. That is, when interlinking a plurality of bicycle stands, according to the invention, the inherent stability makes an additional anchoring in the ground unnecessary. If an additional anchoring is nevertheless effected, it is required only at individual places in the bicycle stand system, in contrast to the known constructions.

Finally, a risk of injury is virtually excluded in contrast to many of the known bicycle stands because of the shape of the bicycle stands, according to the invention, particularly when using spiral notches with circular arches, and a decisive improvement of the appearance is achieved, that is, also with respect to harmonic adaptation to the environment.

It will be understood that each of the elements described above, or two or more together, may also find a useful application in other types of bicycle stands differing from the types described above.

While the invention has been illustrated and described as embodied in a bicycle stand, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Bicycle stand for parking one bicycle or two bicycles simultaneously from opposite directions, said bicycle stand comprising a vertically extending spiral portion (1) made of circularly bent pipe or solid material and having ends (2) and (3) standing on the ground, said ends (2) and (3) being lengthened by end pieces (4) and (5), said spiral portion having an upper vertex and an elongated adjoining area extending between said ends and said upper vertex, said vertex together with said adjoining area having a height which corresponds to the average height of the steering head pipe/handlebar shaft and seat support/upper portion rear seat stay areas of commercially available bicycles; and a one-piece connecting brace (6) positioned in the lower area of said spiral portion (1) at opposite arc-shaped portions, respectively, said connecting brace having two ends (7) and (8) connected to said spiral portion (1) and bent thereat at such an angle that the spacing between said material of said spiral portion (1) and said connecting brace (6) corresponds at least to the greatest cross-sectional width of the tires and rims of the commercially available bicycles.

2. Bicycle stand according to claim 1, wherein the ends (7) and (8) of said connecting brace (6) have angular pieces which form a stop for the bicycle which is pushed into said bicycle stand.

3. Bicycle stand according to claim 1, further including at least one tie-rod (9) arranged in the lower area of said spiral portion (1) at the opposite arc-shaped portions in such a way that said tie-rod overlaps a portion of the wheel during the parking of said bicycles.

4. Bicycle stand according to claim 1, wherein said spiral portion (a) is at least left-handed and right-handed.

5. Bicycle stand according to claim 1, wherein said spiral portion (1) extends with a changing curve radius.

6. Bicycle stand according to claim 1, wherein said material of said spiral portion (1) is angularly bent and said spiral portion (1) has the shape of a trapezoid (1').

7. Bicycle stand according to claim 1, wherein end pieces (4', 5') are fixed but detachably attached to said ends (2) and (3) of said spiral portion (1, 1', 1''), said end pieces (4', 5') being connected with said spiral portion (1, 1', 1'') by pegs (10).

8. Bicycle stand according to claim 7, wherein another said bicycle stand, is attached to said bicycle stand by pegs (10) so as to be fixed but detachable after said end pieces (4') and (5') are detached.

9. Bicycle stand according to claim 7, further including spacer-connection pieces (11, 12, 13, 14) attached to said ends (2) and (3) of said spiral portions (1, 1', 1'') by said pegs (10) so as to be fixed but detachable after detaching said end pieces (4') and (5'), said spacer-connection pieces (11, 12, 13, 14) being suitable for such a connection with said bicycle stand and an optional shape of said pieces determining a spacing between bicycle stands.

10. Bicycle stand according to claim 8, wherein bicycle stand rows are provided, which are formed in a continuous manner by joining said bicycle stands with one another with spacer-connection pieces (11, 12, 13, 14).

11. Bicycle stand according to claim 7, wherein said spiral portion (1, 1', 1"), said end pieces (4, 4', 5, 5') and said connecting brace (6) are made of metal.

12. Bicycle stand according to claim 4, wherein said spiral portion (1) extends with a changing curve radius.

13. Bicycle stand according to claim 4, wherein said material of said spiral portion (1) is angularly bent and said spiral portion (1) has the shape of a trapezoid (1').

14. Bicycle stand according to claim 4, wherein the end pieces (4', 5') are attached to said ends (2) and (3) of said spiral portion (1, 1', 1") and connected with said spiral portion (1, 1', 1") by pegs (10).

15. Bicycle stand according to claim 9, wherein bicycle stand rows are provided which are formed in a continuous manner by joining bicycle stands with one another.

16. Bicycle stand according to claim 5, wherein said spiral portion extends elliptically.

17. Bicycle stand according to claim 1, wherein said spiral portion has the shape of rectangle.

18. Bicycle stand according to claim 1, wherein said spiral portion has the shape of square.

19. Bicycle stand according to claim 1, wherein said spiral portion has the shape of triangle.

20. Bicycle stand according to claim 7, wherein said spiral portion, said end pieces and said connecting brace are made of plastic.

21. Bicycle stand according to claim 7, wherein said spiral portion, said end pieces and said connecting brace are made of bow wood.

* * * * *